United States Patent [19]
Gosselink et al.

[11] Patent Number: 5,843,878
[45] Date of Patent: Dec. 1, 1998

[54] DETERGENT COMPOSITIONS COMPRISING SOIL RELEASE AGENTS

[75] Inventors: Eugene Paul Gosselink; Robert Ya-Lin Pan, both of Cincinnati, Ohio; Robin Gibson Hall, Newcastle Upon Tyne, United Kingdom

[73] Assignee: Procter & Gamble Company, Cincinnati, Ohio

[21] Appl. No.: 598,144

[22] Filed: Feb. 7, 1996

Related U.S. Application Data

[63] Continuation of Ser. No. 468,151, Jun. 6, 1995, abandoned, which is a continuation of Ser. No. 361,903, Dec. 21, 1994, abandoned, which is a continuation of Ser. No. 123,618, Sep. 17, 1993, abandoned, which is a continuation of Ser. No. 88,704, Jul. 8, 1993.

[51] Int. Cl.$^6$ ...................................................... C11D 3/37
[52] U.S. Cl. .......................... 510/299; 510/360; 510/475; 510/528
[58] Field of Search .............................. 252/8.7, 8.9, 95, 252/174.21, 174.22, 174.23, DIG. 15; 510/299, 360, 475, 528

[56] References Cited

U.S. PATENT DOCUMENTS

| | | | |
|---|---|---|---|
| 3,712,873 | 1/1973 | Zenk | 260/29.2 |
| 3,962,152 | 6/1976 | Nicoi et al. | 252/551 |
| 4,238,531 | 12/1980 | Rudy et al. | 427/242 |
| 4,702,857 | 10/1987 | Gosselink | 252/174.21 |
| 4,711,730 | 12/1987 | Gosselink et al. | 252/8.75 |
| 4,713,194 | 12/1987 | Gosselink | 252/174.23 |
| 4,721,580 | 1/1988 | Gosselink et al. | 252/90 |
| 4,764,289 | 8/1988 | Trinh | 252/8.6 |
| 4,818,569 | 4/1989 | Trinh et al. | 427/242 |
| 4,861,512 | 8/1989 | Gosselink | 252/174.23 |
| 4,877,896 | 10/1989 | Maldonado et al. | 560/14 |
| 4,956,447 | 9/1990 | Gosselink et al. | 528/272 |
| 4,968,451 | 11/1990 | Scheibel et al. | 252/549 |
| 4,976,879 | 12/1990 | Maldonado et al. | 252/8.7 |
| 5,039,782 | 8/1991 | Langer et al. | 528/272 |
| 5,041,230 | 8/1991 | Borcher, Sr. et al. | 252/8.9 |
| 5,082,578 | 1/1992 | Langer et al. | 252/8.7 |
| 5,182,043 | 1/1993 | Morrall et al. | 252/174 |
| 5,256,168 | 10/1993 | Morrall et al. | 8/137 |
| 5,486,297 | 1/1996 | Marin-Carrillo et al. | 252/8.6 |

FOREIGN PATENT DOCUMENTS

| | | | |
|---|---|---|---|
| 1100262 | 5/1981 | Canada | D06M 13/34 |
| 0185427A2 | 6/1986 | European Pat. Off. | C08G 63/66 |
| 0272033 A2 | 6/1988 | European Pat. Off. | C08G 63/66 |
| 2172608 | 9/1986 | United Kingdom | C11D 3/60 |
| 92/04433 | 3/1992 | WIPO | C11D 3/00 |

OTHER PUBLICATIONS

Odian, G., "Principles of Polymerization, 2nd Ed.", 1981, pp. 18–20.

Odian, G., "Principles of Polymerization, 2nd Ed.", 1981, pp. 102–105.

*Primary Examiner*—Allen J. Robinson
*Assistant Examiner*—Barbara Badio
*Attorney, Agent, or Firm*—Richard S. Echler, Sr.; Brian M. Bolam; Kim William Zerby

[57] ABSTRACT

Detergent compositions comprising anionic ethoxylated or propoxylated hydroxy ethane and propane sulfonate, $NaO_3SCH_2CH_2CH_2-O(CH_2CH_2O)_n-$ end-capped esters useful as soil release agents. The esters further contain terephthalate units, oxy-1,2-alkyleneoxy units (oxyethyleneoxy units preferred), and sulfoisophthalate units.

18 Claims, No Drawings

DETERGENT COMPOSITIONS COMPRISING SOIL RELEASE AGENTS

CROSS REFERENCE TO RELATED APPLICATION

This is a continuation of application Ser. No. 08/468,151, filed on Jun. 6, 1995, now abandoned, which is a continuation of application Ser. No. 08/361,903, filed on Dec. 21, 1994, now abandoned, which is a continuation of application Ser. No. 08/123,618, filed on Sep. 17, 1993, now abandoned, which is a continuation-in-part of co-pending application Ser. No. 08/088,704, filed Jul. 8, 1993.

TECHNICAL FIELD

The present invention relates laundry detergents comprising anionic ester compositions useful as soil-releasing ingredients.

BACKGROUND OF THE INVENTION

A wide variety of soil release agents (s.r.a.'s) for use in in-home fabric treatment processes such as laundering, fabric drying in hot air clothes dryers, and the like are known in the art. Various s.r.a.'s have been commercialized and are currently used in detergent compositions and fabric softener/antistatic articles and compositions. Such s.r.a.'s typically comprise an oligomeric ester "backbone" and one or more "end-capping" units.

While nonionic s.r.a.'s are known in the literature, many of the commercially important s.r.a.'s are anionic. Such anionic s.r.a.'s typically comprise an oligoester backbone, which may itself optionally contain various anionic substituents, and will usually terminate with one or more end-capping units which are also anionic. For example, various oxy-alkylene/terephthalate/sulfoisophthaloyl oligomers end-capped with sulfoaroyl substituents comprise a known and important class of s.r.a.'s for use in laundry detergents and fabric softeners.

Arguably, as between laundry detergents and fabric softeners, the more difficult of consumer laundry products for the purpose of incorporating soil release agents are laundry detergent compositions, especially granular detergents. Compatibility requirements of soil release agents, especially with the alkaline, anionic detergent environments commonly present in such detergent compositions, provide a substantial technical challenge.

Additionally, in contrast to the fabric softening environment in which certain s.r.a.'s have been used, a soil release agent in consumer laundry products will usually be exposed to various detersive ingredients, such as anionic surfactants, alkaline builders, and the like. Such chemicals may reduce the effectiveness of soil release agents, for example, by preventing their deposition on fabrics. The soil release agents may, reciprocally, reduce the laundry benefits of detersive ingredients. In a "thru-the-wash" mode, it is especially important that no formulation ingredient, including the soil release agent, should promote redeposition of suspended soils in the laundry liquor; this would dull the appearance of the laundered fabrics.

Another hinderance in the use of s.r.a.'s in detergent compositions is the added costs associated with the product. The manufacture of s.r.a.'s having sulfoaroyl end-caps is expensive due to the expense of the sulfoaroyl raw materials. Accordingly, it is of substantial interest to the manufacturers of anionic ester-type s.r.a.'s to find a less expensive type of anionic end-capping unit. It is also important, especially for detergent compositions, that the anionic end-capping units be compatible with sulfoisophthaloyl backbone units. The use of sulfoisophthalate in the backbone stabilizes the ester and prevents the desired amorphous form of the oligomer from converting to a less soluble crystalline form during storage or use.

It has now been discovered that soil release agents comprising ethoxylated or propoxylated hydroxy-ethane and propane sulfonate end-capping units, sulfoisophthaloyl units, oxyethyleneoxy units and/or oxypropyleneoxy and, optionally, poly(oxyethylene)oxy units can be employed as effective and efficient soil release agents in detergent compositions, especially granular detergents. Further, the end-capping unit provides a less expensive substitute for the sulfoaroyl end-caps, presently employed in anionic s.r.a.'s, and are compatible with sulfoisophthaloyl units in the backbone.

It is an object of the present invention to provide novel, less expensive s.r.a.'s which can be used as effective and product-compatible soil release agents in consumer products such as granular detergent compositions.

These and other objects are secured herein as will be seen from the following disclosure.

BACKGROUND ART

U.S. Pat. No. 4,721,580, Gosselink, issued Jan. 26, 1988, discloses soil release oligomeric esters and mixtures thereof with end-caps having the formula $NaO_3S(CH_2CH_2O)_n$— but with different backbone ester units from those of the present invention. See also U.S. Pat. No. 4,968,451, Scheibel et al.

U.S. Pat. No. 4,764,289, Trinh, issued Aug. 16, 1988, discloses dryer-added fabric articles utilizing anionic polymeric soil release agents. See also U.S. Pat. No. 4,818,569.

U.S. Pat. No. 4,877,896, Maldonado et al, issued Oct. 31, 1989, discloses end-capped esters useful as soil release agents in detergent compositions and fabric-conditioner articles comprising terephthalate esters.

Types of synthetic and analytical methods useful herein are well illustrated in Odian, *Principles of Polymerization*, Wiley, New York, 1981, which is incorporated herein by reference. Chapter 2.8 of the Odian reference, entitled "Process Conditions", pp 102–105, focuses on the synthesis of poly(ethylene terephthalate).

SUMMARY OF THE INVENTION

The present invention encompasses detergent compositions comprising oligomeric, substantially linear, end-capped esters, said esters comprising oxyethyleneoxy units, terephthaloyl units, and sulfoisophthalate units. Preferred esters additionally comprise oxy-1,2-propyleneoxy units. Optionally, the esters herein further comprise poly (oxyethylene)oxy units (with degree of polymerization of at least 2). (Mixtures of such esters with reaction by-products and the like retain their utility as fabric soil release agents when they contain at least 10% by weight of said linear end-capped esters.) The esters herein are of relatively low molecular weight (i.e., generally below the range of fiber-forming polyesters) typically ranging from about 500 to about 8,000.

Taken in their broadest aspect, the s.r.a.'s employed herein encompass an oligomeric ester "backbone" which is end-capped on one, or preferably both, ends of the backbone by the the essential end-capping units.

The essential end-capping units herein are anionic hydrophiles, derived from ethoxylated or propoxylated hydroxy-ethane and propane sulfonate groups and connected to the esters by an ester linkage. The preferred end-capping units are of the formula $(MO_3S)(CH_2)_m(CH_2CH_2O)(RO)_n$—, wherein M is a salt-forming cation such as sodium or tetraalkylammonium, R is ethylene, propylene or a mixture thereof, n is from 0 to 4, and m is 0 or 1.

Certain noncharged, hydrophobic aryldicarbonyl units are also essential in the backbone unit of the oligoesters herein. Preferably, these are exclusively terephthaloyl units. Other noncharged, hydrophobic aryldicarbonyl units, such as isophthaloyl or the like, can also be present if desired, provided that the soil release properties of the esters (especially polyester substantivity) are not significantly diminished.

Additionally, essential hydrophilic units are also incorporated into the backbone unit of the esters. For example, anionic hydrophilic units capable of forming two ester bonds may be used. Suitable anionic hydrophilic units of this specific type are well illustrated by sulfonated dicarbonyl units, such as sulfoisophthaloyl, i.e., —$(O)C(C_6H_3)(SO_3M)C(O)$—, wherein M is a salt-forming cation such as an alkali metal or tetraalkylammonium ion.

Generally, if it is desired to modify the units of the esters, use of additional hydrophilic units is preferable to use of additional noncharged, hydrophobic units.

Thus, esters herein comprise:

i) from about 1 to about 2 moles of end-capping units of the formula $(MO_3S)(CH_2)_m(CH_2CH_2O)(RO)_n$—, wherein M is a salt-forming cation such as sodium or tetraalkylammonium, R is ethylene, propylene or a mixture thereof, m is 0 or 1, and n is from 0 to 4;

ii) from about 0.5 to about 66 moles of units selected from the group consisting of:
   a) oxyethyleneoxy units;
   b) oxy-1,2-propyleneoxy units; and
   c) mixtures of a) and b);

iii) from 0 to about 50 moles of di(oxyethylene)oxy units;

iv) from 0 to about 50 moles of poly(oxyethylene)oxy units with a degree of polymerization of at least 3;

v) from about 1.5 to about 40 moles of terephthaloyl units; and vi) from about 0.05 to about 26 moles of 5-sulfoisophthaloyl units of the formula —$(O)C(C_6H_3)(SO_3M)C(O)$—, wherein M is a salt forming cation such as an alkali metal or tetraalkylammonium ion; provided that the total moles of units ii), iii), and iv) ranges from about 0.5 to about 66 moles and provided that the total of units iii) and iv) is no more than 75% of the total of units ii), iii), and iv) and provided that the weight percent of iii) and iv) is no more than 50% of the total weight of the oligomeric ester.

The end-capping units used in these esters are preferably sodium 2-(2-hydroxyethoxy)ethanesulfonate, 2-[2-(2-hydroxyethoxy)ethoxy]ethanesulfonate, or sodium 3-[2-(2-hydroxyethoxy)ethoxy]propanesulfonate as in i). Preferred end-capped esters herein are essentially in the doubly end-capped form, comprising about 2 moles of said end-capping units per mole of said ester.

The ester "backbone" of the present soil release agent, by definition, comprises all the units other than the end-capping units; all the units incorporated into the esters being interconnected by means of ester bonds. Thus, in one simple embodiment, the ester "backbones" comprise only terephthaloyl units, oxyethyleneoxy units, and 5-sulfoisophthaloyl units. In other preferred embodiments incorporating oxy-1,2-propyleneoxy units, the ester "backbone" comprises terephthaloyl units, 5-sulfoisophthaloyl units, oxyethyleneoxy, and oxy-1,2-propyleneoxy units; the mole ratio of the latter two types of units ranges from about 0.5:1 to about 10:1.

In still other preferred embodiments, the ester "backbone" comprises terephthaloyl units, 5-sulfoisophthaloyl units, oxyethyleneoxy, oxy-1,2-propyleneoxy units, and di(oxyethylene)oxy units.

In yet still other preferred embodiments, the ester "backbone" comprises terephthaloyl units, 5-sulfoisophthaloyl units, oxyethyleneoxy, oxy-1,2-propyleneoxy units, di(oxyethylene)oxy units, and poly(oxyethylene)oxy units. The poly(oxyethylene)oxy units, which aid in the rate of dissolution of the ester and reduce melt viscosity, will typically constitute from 0 to about 75 mole percent of total oxyalkyleneoxy units per ester depending upon the degree of polymerization of the poly(oxyethylene)oxy unit and the length of the ester backbone.

The soil release agents provided by the invention are well illustrated by one comprising from about 25% to about 100% by weight of ester having the empirical formula $(CAP)_x(EG/PG)_{y'}(DEG)_{y''}(PEG)_{y'''}(T)_z(SIP)_q$; wherein (CAP) represents the sodium salt form of said end-capping units i); (EG/PG) represents said oxyethyleneoxy and oxy-1,2-propyleneoxy units ii); (DEG) represents said di(oxyethylene)oxy units iii); (PEG) represents said poly(oxyethylene)oxy units iv); (T) represents said terephthaloyl units v); (SIP) represents the sodium salt form of said 5-sulfoisophthaloyl units vi); x is from about 1 to 2; y' is from about 0.5 to about 66; y'' is from 0 to about 50; y''' is from 0 to about 50; y'+y''+y''' totals from about 0.5 to about 66; z is from about 1.5 to about 40; and q is from about 0.05 to about 26; wherein x, y', y'', y''', z and q represent the average number of moles of the corresponding units per mole of said ester. Excellent soil release agents are those wherein at least about 50% by weight of said ester has a molecular weight ranging from about 500 to about 5,000.

More preferably in soil release agents of this invention, the oxyethyleneoxy:oxy-1,2-propyleneoxy mole ratio ranges from about 0.5:1 to about 10:1; x is about 2, y' is from about 2 to about 27, z is from about 2 to about 20, and q is about 0.4 to about 8. In the most highly preferred of these soil release agents, x is about 2, y' is about 5, z is about 5, and q is about 1.

The present invention encompasses granular detergent compositions comprising said soil release agents and at least about 1%, preferably from about 1% to about 99.9%, most preferably from about 5% to about 80%, of a detersive surfactant. The detergent compositions can optionally comprise detergent builders and other conventional detersive ingredients. The soil release agents will typically constitute at least about 0.1%, preferably from about 0.1% to about 10%, most preferably from about 0.2% to about 3.0%, by weight of a granular detergent.

Methods of laundering fabrics and providing soil release finish thereto are also included in this invention. The preferred method of laundering involves contacting the fabrics with an aqueous wash liquor comprising the soil release agent in a detergent composition for about 5 minutes to about 1 hour. The fabrics can then be rinsed with water and line- or tumble-dried.

All percentages, ratios, and proportions herein are on a weight basis unless otherwise indicated. All documents cited are incorporated herein by reference.

DETAILED DESCRIPTION OF THE INVENTION

The present invention encompasses novel granular laundry detergent compositions comprising soil release agents.

The essential component of the compositions is a particular kind of ester characterized by certain essential end-capping units as well as other essential units all in particular proportions and having structural arrangements as described hereinafter.

The following structure is illustrative, but by no means limiting, of preferred structures of ester molecules of the invention:

Molecular Geometry—The esters of the invention are all "substantially linear" in the sense that they are not significantly branched or crosslinked by virtue of the incorporation into their structure of units having more than two ester-bond forming sites. (By contrast, a typical example of polyester branching or crosslinking of the type excluded in defining esters of the present invention, see Sinker et al, U.S. Pat. No. 4,554,328, issued Nov. 19, 1985.) Furthermore, no cyclic esters are essential for the purposes of the invention but may

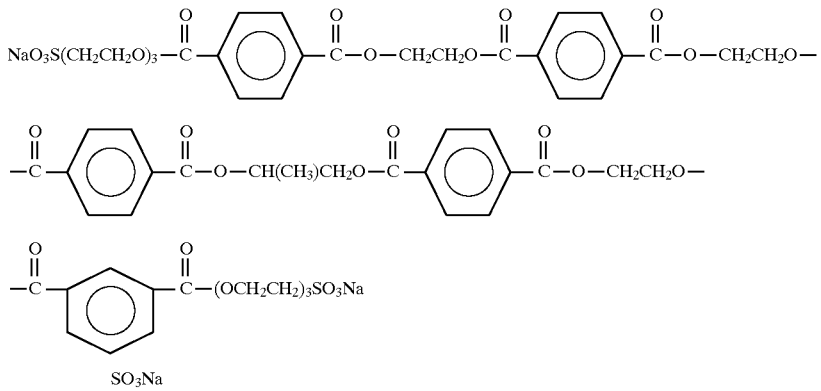

The esters herein can be simply characterized as oligomers which comprise a substantially linear ester "backbone" and end-capping units which are ethoxylated or propoxylated hydroxyethane and propane sulfonate monomers, especially 2-(2-hydroxyethoxy)ethanesulfonate, or ethoxylated 3-hydroxy-propanesulfonate monomers, especially 3-[2-(2-hydroxyethoxy)ethoxy]propanesulfonate. Proper selection of the structural units which comprise the ester backbone and use of sufficient amounts of the sulfonated end-capping units result in the desired soil release properties of these materials.

Oligomeric Esters—It is to be understood that the soil release agents herein are not resinous, high molecular weight, macromolecular or fiber-forming polyesters but, instead, are relatively low molecular weight and contain species more appropriately described as oligomers rather than as polymers. Individual ester molecules herein, including the end-capping units, can have molecular weights ranging from about 500 to about 8,000. Relevant for purposes of comparison with glycol-terephthalate fibrous polyesters (typically averaging 15,000 or more in molecular weight) is the molecular weight range from about 500 to about 5,000, within which molecules of the preferred esters of the invention which incorporate the essential units are generally found. Accordingly, the soil release agents of this invention are referred to as "oligomeric esters" rather than "polyester" in the colloquial sense of that term as commonly used to denote high polymers such as fibrous polyesters.

be present in the compositions of the invention at low levels as a result of side-reactions during ester synthesis. Preferably, cyclic esters will not exceed about 2% by weight of the soil release agents; most preferably, they will be entirely absent from the agents.

Contrasting with the above, the term "substantially linear" as applied to the esters herein does, however, expressly encompass materials which contain side-chains which are unreactive in ester-forming or transesterification reactions. Thus, oxy-1,2-propyleneoxy units are of an unsymmetrically substituted type; their methyl groups do not constitute what is conventionally regarded as "branching" in polymer technology (see Odian, Principles of Polymerization, Wiley, New York, 1981, pages 18–19, with which the present definitions are fully consistent) and are unreactive in ester-forming reactions. Optional units in the esters of the invention can likewise have side-chains, provided that they conform with the same nonreactivity criterion.

Molecular Structures—The following structures are illustrative of structures of ester molecules falling within the foregoing preferred embodiments, and demonstrate how the units are connected:

a) doubly end-capped ester molecule comprised of the essential units i), ii), v) and vi);

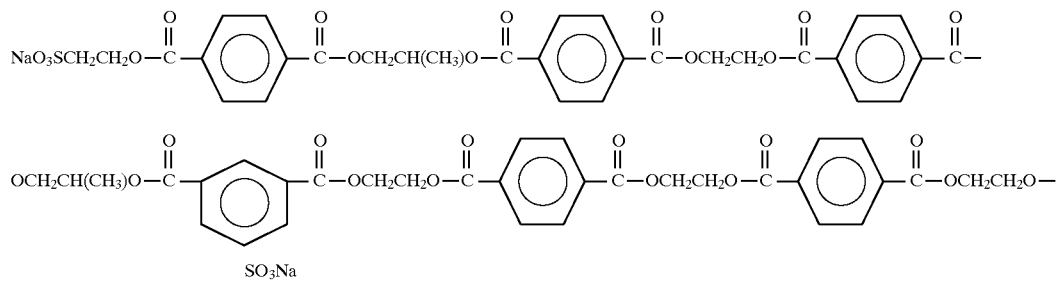

-continued

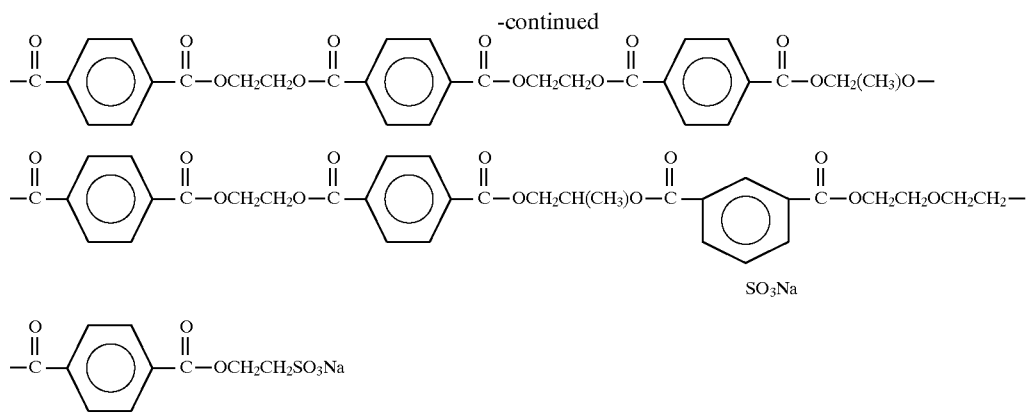

b) singly end-capped ester molecule comprised of essential units i), ii), v) and vi);

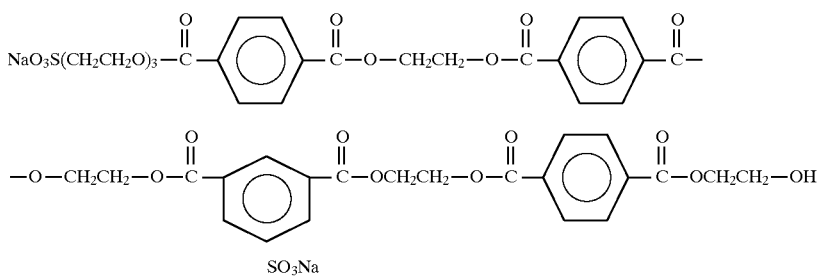

c) doubly end-capped ester molecule, (termed a "hybrid backbone" ester molecule herein) comprised of essential units i), ii), v) and vi). Units ii) are a mixture of oxyethyleneoxy and oxy-1,2-propyleneoxy units, in the example shown below at a 2:1 mole ratio (on average in ester compositions as a whole, in contrast to individual molecules such as illustrated here, ratios ranging from about 0.5:1 to about 10:1 are preferred);

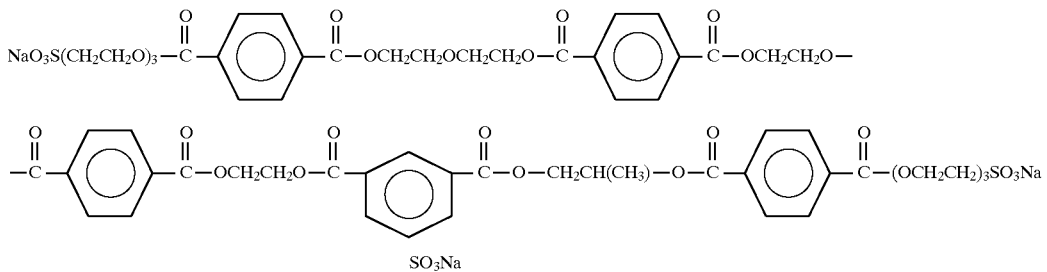

In the context of the structures of ester molecules disclosed herein, it should be recognized that the present invention encompasses not only the arrangement of units at the molecular level but also the gross mixtures of esters which result from the reaction schemes and which have the desired range of composition and properties. Accordingly, when the number of monomer units or ratios of units are given, the numbers refer to an average quantity of monomer units present in oligomers of the soil release agent.

Ester Backbone—As illustrated in the structures shown above, in the esters of this invention, the backbone is formed by 5-sulfoisophthaloyl units, terephthaloyl units, oxyethyleneoxy or mixtures of oxyethyleneoxy, oxypropyleneoxy, di(oxyethylene)oxy and poly(oxyethylene)oxy units connected with alternation of the aryldicarbonyl and oxyalkyleneoxy units.

Groups at the Termini of the Ester Backbone—Likewise, the "esters of this invention" is a term which encompasses the novel doubly and singly end-capped compounds disclosed herein, mixtures thereof, and mixtures of said end-capped materials which may unavoidably contain some non-capped species. Although, levels of the latter will be zero or at a minimum in all of the highly preferred soil release agents. Thus, when referring simply to an "ester" herein, it is furthermore intended to refer, by definition, collectively to the mixture of sulfonated capped and uncapped ester molecules resulting from any single preparation.

Any ester molecules which are present in compositions of the invention which are not fully, i.e., doubly, end-capped by the end-capping units must terminate with units which are not ethoxylated or propoxylated hydroxy-ethane and propane sulfonate end-capping units. These termini will typically be hydroxyl groups or other groups attributable to the backbone unit-forming reactant. For example in structure b) above, a chain terminal position to which is attached —H forms a hydroxyl group. In other structures which may be constructed, units such as —(O)CC$_6$H$_4$C(O)—OCH$_3$ may be found in terminal positions. All the most highly preferred ester molecules herein will, however, as indicated above, have two end-capping units and no backbone units occupying terminal positions.

Symmetry—It is to be appreciated that in esters in which oxy-1,2-propyleneoxy units are also present, the oxy-1,2-propyleneoxy units can have their methyl groups randomly alternating with one of the adjacent —CH$_2$— hydrogen atoms, thereby lowering the symmetry of the ester chain. Thus, the oxy-1,2-propyleneoxy unit can be depicted as having either the —OCH$_2$CH(CH$_3$)O— orientation or as having the opposite —OCH(CH$_3$)CH$_2$O— orientation. Carbon atoms in the oxy-1,2-propylene units to which the methyl groups are attached are, furthermore, asymmetric, i.e., chiral; they have four nonequivalent chemical entities attached.

It should also be noted that the essential non-charged aryldicarbonyl units herein need not exclusively be terephthaloyl units provided that the polyester-fabric-substantivity of the ester is not harmed to a significant extent. Thus, for example, minor amounts of isomeric non-charged dicarbonyl units, isophthaloyl or the like, are acceptable for incorporation into the esters. In addition, minor amounts of aliphatic dicarbonyl units, such as adipoyl, may be present provided that the level does not significantly diminish the soil release properties of the esters.

Di(oxydiethylene)oxy Units—The optional di(oxyethylene)oxy units comprising the esters of the present invention can constitute from 0 to about 75 mole percent of the total oxyalkyleneoxy units present. Preferably, di(oxyethylene)oxy units are present when the backbone unit comprises 8 or more terephthaloyl units; however, at least some di(oxyethylene)oxy units may be present in esters with as few as 1.5 terephthaloyl units.

Poly(oxyethylene)oxy Units—The optional poly (oxyethylene)oxy units comprising the esters of the present invention have a degree of polymerization of at least 3, preferably from about 3 to about 200, most preferably from about 3 to about 100, and can constitute from 0 to about 75 mole percent of the total oxyalkyleneoxy units present. The total average weight percent of di(oxyethylene)oxy units and poly(oxyethylene)oxy units in the soil release agent composition must be below about 50% of the total weight of the oligomer and balanced to give acceptable melt viscosity (i.e., below about 40,000 cPs at 230° C. and below about 160,000 cPs at 200° C.) while maintaining the desirable physical properties of the agent below about 50° C. Likewise, the level must be selected to avoid over promotion of backbone segment crystallization during cooling or subsequent storage or use. This is particularly important when a high proportion of the oxyalkyleneoxy units are oxyethyleneoxy. If di- and/or poly(oxyethylene)oxy units are incorporated in the ester composition, the total average weight percent is about 1 to about 25 percent for anionic soil release agent compositions having an average of about 2.5 to about 5 anionic units per ester.

The amount of poly(oxyethylene)oxy units present in the backbone is related to its degree of polymerization. For example, oxyethyleneoxyethyleneoxyethyleneoxy units (formed from triethylene glycol), which have a degree of polymerization of three, can constitute from 0 to 75 mole percent of the total oxyalkyleneoxy units in the backbone. In another example, poly(oxyalkylene)oxy units (formed from PEG-1000 which has a degree of polymerization of 22) can constitiute from 0 to about 33 mole percent of the total oxyalkyleneoxy units present in the backbone.

End-Capping Units—The end-capping units provide anionic charged sites when the esters are dispersed in aqueous media such as a laundry liquor. The end-caps serve to assist transport in aqueous media and to provide hydrophilic sites on the ester molecules.

The end-capping units herein have the formula (MO$_3$S)(CH$_2$)$_m$(CH$_2$CH$_2$O)(RO)$_n$—, wherein M is a salt-forming cation such as an alkali metal or tetraalkylammonium ion, R is ethylene, propylene or a mixture thereof, m is 0 or 1, and n is from 0 to 4. It is not intended to exclude the acid form, but most generally the esters herein are used as sodium salts, as salts of other alkali metals, as salts with nitrogen-containing cations (especially tetraalkylammonium), or as the disassociated ions in an aqueous environment.

Examples of end-capping groups include sodium 2-[2-(2-hydroxyethoxy)ethoxy]ethanesulfonate, sodium 2-{2-[2-(2-hydroxyethoxy)ethoxy]ethoxy}ethanesulfonate, sodium 2-{2-[2-(2-{2-hydroxyethoxy}ethoxy)ethoxy]ethoxy}ethanesulfonate, 3-[2-(2-hydroxyethoxy)ethoxy]propanesulfonate, and sodium alpha-3-sulfopropyl-omega-hydroxypoly(oxy-1,2-ethanediyl], with average degree of ethoxylation of 2–4, and mixtures thereof.

On a mole basis, the soil release agents herein will preferably comprise from about one to about two moles of the end-capping units per mole of the ester. Most preferably, the esters are doubly end-capped; i.e., there will be two moles of end-capping units present per mole of the esters. From the viewpoint of weight composition, it will be clear that the fractional contribution of end-capping units to the molecular weight of the esters will decrease as the molecular weight of the ester backbone increases.

Method for Making End-Capped Esters—The ester soil release agents of the present invention can be prepared using any one or combination of several alternative general reaction types, each being well-known in the art. Many different starting materials and diverse, well-known experimental and analytical techniques are useful for the syntheses.

Mechanistically, the suitable general reaction types for preparing esters of the invention include those classifiable as:

1. alcoholysis of acyl halides;
2. esterification of organic acids;
3. alcoholysis of esters (transesterification); and
4. reaction of alkylene carbonates with organic acids.

Of the above, reaction types 2–4 are highly preferred since they render unnecessary the use of expensive solvents and halogenated reactants. Reaction types 2 and 3 are especially preferred as being the most economical.

Suitable starting materials or reactants for making the esters of this invention are any reactants (especially esterifiable or transesterifiable reactants) that are capable of combining in accordance with the reaction types 1–4, or combinations thereof, to provide esters having the correct proportions of all the above-specified units (i) to (iv) of the esters. Such reactants can be categorized as "simple" reactants, i.e., those that are singly capable of providing only one kind of unit necessary for making the esters, or as derivatives of the simple reactants which singly contain two or more different types of unit necessary for making the esters. Illustrative of the simple kind of reactant is dimethyl terephthalate which can provide only terephthaloyl units. In contrast, bis(2-hydroxypropyl)terephthalate is a reactant that can be prepared from dimethyl terephthalate and 1,2- propylene glycol and which can desirably be used to provide two kinds of unit, viz. oxy-1,2propyleneoxy and terephthaloyl, for making the esters herein.

In principle it is also possible to use oligoesters, or polyesters such as poly(ethylene terephthalate), as reactants herein and to conduct transesterification with a view to incorporation of end-capping units while decreasing molecular weight. Nonetheless, the more highly preferred procedure is to make the esters from the simplest reactants in a process involving molecular weight increase (to the limited extent provided for by the invention) and end-capping.

Since "simple" reactants are those which will most preferably and conveniently be used, it is useful to illustrate this kind of reactant in more detail. Thus, 2-(2-hydroxyethoxy) ethanesulfonate can be used as the source of the essential end-capping units herein. Note that the metal cation can be replaced by potassium or a nitrogen-containing cation provided that the latter does not overly promote crystallization of the oligomer and is unreactive during the synthesis, e.g. tetraalkylammonium. It is, of course, possible to subject any of the esters of the invention to cation exchange after the synthesis and, thereby, afford a means of introducing more esoteric or reactive cations into the ester compositions.

Appropriate glycols or cyclic carbonate derivatives thereof can be used to provide oxy-1,2-alkyleneoxy units; thus, 1,2-propylene glycol or (where the starting carboxyl groups are present in an acidic form) the cyclic carbonate

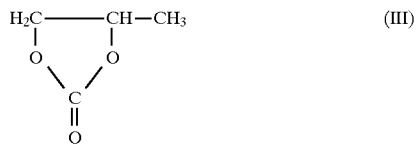

are suitable sources of oxy-1,2-propyleneoxy units for use herein.

Oxyethyleneoxy units are most conveniently provided by ethylene glycol. Although, as an alternative, ethylene carbonate could be used when free carboxylic acid groups are to be esterified. Oxydiethyleneoxy units are most conveniently provided by diethylene glycol. Poly(oxyethylene) oxy units are most conveniently provided by triethylene glycol, tetraethylene glycol, higher polyethylene glycols and mixtures thereof. Additionally, minor amounts of poly (oxyethylene)oxy may be formed as a side reaction in the ester synthesis.

Aryldicarboxylic acids or their lower alkyl esters can be used to provide the essential aryldicarbonyl units; thus, terephthalic acid or dimethyl terephthalate are suitable sources of terephthaloyl units.

Other units of the esters will be provided by well-known and readily identifiable reagents; for example, dimethyl 5-sulfoisophthalate is an example of a reagent capable of providing 5-sulfoisophthaloyl units for optional incorporation into the esters of the invention.

When starting with the simplest reactants as illustrated above, the overall synthesis is usually multi-step and involves at least two stages, such as an initial esterification or transesterification (also known as ester interchange) stage followed by an oligomerization stage in which molecular weights of the esters are increased, but only to a limited extent as provided for by the invention.

Formation of ester-bonds in reaction types 2 and 3 involves elimination of low molecular weight by-products such as water (reaction 2) or simple alcohols (reaction 3). Complete removal of the latter from reaction mixtures is generally somewhat easier than removal of the former.

However, since the ester-bond forming reactions are generally reversible, it is necessary to "drive" the reactions forward in both instances by removing these by-products.

In practical terms, in the first stage (ester interchange) the reactants are mixed in appropriate proportions and are heated to provide a melt at atmospheric or slightly superatmospheric pressures (preferably of an inert gas such as nitrogen or argon). Water and/or low molecular weight alcohol is liberated and is distilled from the reactor at temperatures up to about 200° C. (A temperature range of from about 150°–200° C. is generally preferred for this stage).

In the second (i.e., oligomerization) stage, vacuum and temperatures somewhat higher than in the first stage are applied; removal of volatile by-products and excess reactants continues until the reaction is complete, as monitored by conventional spectroscopic techniques. Continuously applied vacuum, typically of about 10 mm Hg or lower can be used.

In both of the above-described reaction stages, it is necessary to balance on one hand the desire for rapid and complete reaction (higher temperatures and shorter times preferred), against the need to avoid thermal degradation (which undesirably might result in off-colors and by-products). It is possible to use generally higher reaction temperatures especially when reactor design minimizes super-heating or "hot spots"; also, ester-forming reactions in which ethylene glycol is present are more tolerant of higher temperatures. Thus, a suitable temperature for oligomerization lies most preferably in the range of from about 150° C. to about 260° C. when higher ratios of EG/PG are present and in the range of from about 150° C. to about 240° C. when lower ratios of EG/PG are present (assuming that no special precautions, such as of reactor design, are otherwise taken to limit thermolysis). When tetraalkylammonium cations are present, condensation temperatures are preferably 150°–240° C.

It is very important in the above-described procedure to use continuous mixing so that the reactants are always in good contact; highly preferred procedures involve formation of a well-stirred homogeneous melt of the reactants in the temperature ranges given above. It is also highly preferred to maximize the surface area of reaction mixture which is exposed to vacuum or inert gas to facilitate the removal of volatiles, especially in the oligomerization step; mixing equipment of a high-shear vortex-forming type giving good gas-liquid contact are best suited for this purpose.

Catalysts and catalyst levels appropriate for esterification, transesterification, oligomerization, and for combinations thereof are all well-known in polyester chemistry, and will generally be used herein; as noted above, a single catalyst will suffice. Suitably catalytic metals are reported in Chemical Abstracts, CA83:178505v, which states that the catalytic activity of transition metal ions during direct esterification of K and Na carboxybenzenesulfonates by ethylene glycol decreases in the order Sn (best), Ti, Pb, Zn, Mn, Co (worst).

The reactions can be continued over periods of time sufficient to guarantee completion, or various conventional analytical monitoring techniques can be employed to monitor progress of the forward reaction; such monitoring makes it possible to speed up the procedures somewhat and to stop the reaction as soon as a product having the minimum acceptable composition is formed. In general, when tetraalkylammonium cations are present, it is preferred to stop the reaction at less than full completion, relative to the sodium cation form, to reduce the possibility of thermal instability.

Appropriate monitoring techniques include measurement of relative and intrinsic viscosities, hydroxyl numbers, $^1$H and $^{13}$C nuclear magnetic resonance (n.m.r) spectra, capillary zone electrophoresis, and liquid chromatograms.

Most conveniently, when using a combination of volatile reactants (such as a glycol) and relatively involatile reactants (such as dimethyl terephthalate), the reaction will be initiated with excess glycol being present. As in the case of ester interchange reactions reported by Odian (op. cit.), "stoichiometric balance is inherently achieved in the last stages of the second step of the process". Excess glycol can be removed from the reaction mixture by distillation; thus, the exact amount used is not critical.

Inasmuch as the final stoichiometry of the ester composition depends on the relative proportions of reactants retained in the reaction mixtures and incorporated into the esters, it is desirable to conduct the condensations in a way which effectively retains the non-glycol reactants and prevents them from distilling or subliming. Dimethyl terephthalate and to a lesser extent the simple glycol esters of terephthalic acid have sufficient volatility to show on occasion "sublimation" to cooler parts of the reaction apparatus. To ensure achieving the desired stoichiometry, it is desirable that this sublimate be returned to the reaction mixture or, alternatively, that sublimation losses be compensated by use of a small excess of terephthalate. In general, sublimation-type losses, such as of dimethyl terephthalate, may be minimized 1) by apparatus design; 2) by raising the reaction temperature slowly enough to allow a large proportion of dimethyl terephthalate to be converted to less volatile glycol esters before reaching the upper reaction temperatures; 3) by conducting the early phase of the transesterification under low to moderate pressure (especially effective is a procedure allowing sufficient reaction time to evolve at least about 90% of the theoretical yield of methanol before applying vacuum); 4) by controlling vacuum during condensation to avoid use of pressures below about 20 mm Hg until the condensation has progressed to the point that most of the terephthalate is beyond the monomeric stage. On the other hand, the "volatile" glycol components used herein must be truly volatile if an excess is to be used. In general, lower glycols or mixtures thereof having boiling points below about 350° C. at atmospheric pressure are used herein; these are volatile enough to be practically removable under typical reaction conditions.

Typically herein, when calculating the relative molar proportions of reactants to be used, the following routine is followed, as illustrated for a combination of the reactants sodium 2-[2-(2-hydroxyethoxy)ethoxy]ethanesulfonate (A), ethylene glycol (B), dimethyl terephthalate (C), and dimethyl 5-sodiosulfoisophthalate (D):

1. the desired degree of end-capping is selected; for the present example, the value 2, most highly preferred according to the invention, is used;
2. the average calculated number of terephthaloyl units in the backbone of the desired ester is selected; for the present example, the value 5, which falls in the range of most highly preferred values according to the invention, is used;
3. the average calculated number of 5-sulfoisophthaloyl units in the backbone of the desired ester is selected; for the present example, the value 1, which falls in the range of most highly preferred values according to the invention, is used;
4. the mole ratio of (A) to (C) to (D) should thus be 2:5:1; amounts of the reactants (A), (C), and (D) are taken accordingly;
5. an appropriate excess of glycol is selected; typically 2 to 10 times the sum of the number of moles of dimethyl sulfoisophthalate and dimethyl terephthalate is suitable.

The glycol used will be calculated in an amount sufficient to allow interconnection of all other units by means of ester bonds. Adding a convenient excess will usually result in a total relative amount of glycol ranging from about 1 to about 10 moles for each mole nonglycol organic reactants added together.

Crystallization of the Soil Release Agent—Soil release agents which contain esters with end-cap units of sodium isethionate, sodium 2-[2-hydroxyethoxy]ethanesulfonate or sodium 3-(2-hydroxyethoxy)propanesulfonate may undergo undesirable crystallization during synthesis or when introduced into the wash liquor, particularly if the oxyethyleneoxy:oxy-1,2-propyleneoxy ratio is above about 1. A sulfonate-type hydrotrope or stabilizer, such as alkylbenzenesulfonate or toluenesulfonate, may be mixed with the reactants during synthesis of the ester to reduce the crystallization problem. Typically from about 0.5% to about 20%, by weight of soil release agent, of stabilizer is added to the soil release agent.

The following describes typical syntheses of the soil release agents herein.

EXAMPLE I

Synthesis of Sodium 2-[2-(2-Hydroxyethoxy)ethoxy] ethanesulfonate—To a 1 L, three neck, round bottom flask equipped with a magnetic stirring bar, modified Claisen head, condenser (set for distillation), thermometer, and temperature controller (Therm-O-Watch™, I$^2$R) is added isethionic acid, sodium salt (Aldrich, 100.0 g, 0.675 mol) and distilled water (~90 ml). After dissolution, one drop of hydrogen peroxide (Aldrich, 30% by wt. in water) is added to oxidize traces of bisulfite. The solution is stirred for one hour. A peroxide indicator strip shows a very weak positive test. Sodium hydroxide pellets (MCB, 2.5 g, 0.0625 mol) are added, followed by diethylene glycol (Fisher, 303.3 g, 2.86 mol). The solution is heated at 190° C. under argon overnight as water distills from the reaction mixture. A $^{13}$C-NMR(DMSO-d$_6$) shows that the reaction is complete by the disappearance of the isethionate peaks at ~53.5 ppm and ~57.4 ppm. The solution is cooled to room temperature and neutralized to pH 7 with 57.4 g of a 16.4 % solution of p-toluenesulfonic acid monohydrate in diethylene glycol. The $^{13}$C-NMR spectrum of the product shows resonances at ~51 ppm (—$\underline{C}$H$_2$SO$_3$Na), ~60 ppm (—$\underline{C}$H$_2$OH), and at ~69 ppm, ~72 ppm, and ~77 ppm for the remaining four methylenes. Small resonances are also visible for the sodium p-toluenesulfonate which formed during neutralization. The reaction affords 451 g of a 35.3% solution of sodium 2-[2-(2-hydroxyethoxy)ethoxy]ethanesulfonate in diethylene glycol. The excess diethylene glycol is removed by adding 0.8 mol % of monobasic potassium phosphate (Aldrich) as a buffer and heating on a Kugelrohr apparatus (Aldrich) at 150° C. for ~3 hrs at ~1 mm Hg to give the desired sodium 2-[2-(2-hydroxyethoxy)ethoxy] ethanesulfonate as an extremely viscous oil or glass.

EXAMPLE II

Synthesis of Sodium Alpha-3-Sulfopropyl-Omega-Hydroxy-Poly(oxy-1,2-ethanediyl), with Average Degree of Ethoxylation of 3—To a 500 ml, three-neck round bottom flask equipped with a stirrer and condenser is added sodium bisulfite (Baker, 70.1 g, 0.675 mol) and 250 ml of water. After all of the salt has dissolved, sodium hydroxide is added (Aldrich, 6.24 g, 0.156 mol), followed by alpha-2-propenyl-omega-hydroxy-poly(oxy-1,2-ethanediyl) (100.0 g, 0.526 mol with average degree of ethoxylation of 3) (made by ethoxylating allyl alcohol to an average degree of about 2.6 followed by stripping of unethoxylated allyl alcohol), sodium persulfate (Aldrich, 6.4 g, 0.027 mol), and iron sulfate heptahydrate (Aldrich, 0.15 g, 0.00054 mol), respectively. After the solution has been stirring for two hours, an additional 7.3 g (0.031 mol) of sodium persulfate is added, and the solution is stirred overnight at room temperature. A $^{13}$C-NMR(D$_2$O) shows the presence of residual peaks for allyl ethoxylate at ~117 ppm and ~134.5 ppm. An additional 6.3 g (0.026 mol) of sodium persulfate is added. The solution turns red at this point, and the pH decreases to ~3. The reaction mixture is adjusted to about pH 7 with sodium hydroxide (50% in water) and is stirred for an additional 3 hours. A $^{13}$C-NMR(D$_2$O) shows the completeness of the reaction by the disappearance of the allyl ethoxylate peaks and the emergence of product peaks at ~24.6 ppm ($\underline{C}$H$_2$CH$_2$SO$_3$Na) and ~48.2 ppm (C$\underline{H}_2$SO$_3$Na), and with the retention of the peak at ~60.8ppm (C$\underline{H}_2$OH). Small peaks for sulfinate-sulfonate functionality [—OCH$_2$CH(SO$_2$Na)—CH$_2$SO$_3$Na] are also visible at ~44.4 ppm and ~62.9 ppm. Hydrogen peroxide (Aldrich, 39.7 g of a 30% solution in water, 0.35 mol) is added to the solution to oxidize the small amount of sulfinate-sulfonate to a disulfonate and the excess bisulfite to bisulfate. The solution becomes acidic (pH~5) and is neutralized with sodium hydroxide. The solution is stirred overnight at room temperature. A $^{13}$C-NMR(D$_2$O) shows that the small sulfinate-sulfonate peak at ~44.3 ppm disappears, and a small disulfonate peak at ~56.9 ppm appears. Peroxide indicator paper shows an excess of hydrogen peroxide. A small amount of platinum (IV) oxide is added, and the solution is stirred at room temperature for three days to decompose the excess peroxide. The reaction mixture is then gravity filtered and water is removed under aspirator vacuum on a rotary evaporator at ~60° C. to precipitate the inorganic salts. Methanol (~1 volume) is added with mixing to form a slurry and the mixture is filtered. The filtrate is heated on the rotary evaporator at ~60° C. for 4 hours to afford about 125 g of the desired sulfopropanol triethoxylate as a white waxy solid. It is used without further purification as a capping monomer for preparation of polymers.

EXAMPLE III

Synthesis of an Oligomer of Sodium 2-[2-(2-hydroxyethoxy)ethoxy]ethanesulfonate, Dimethyl Terephthalate, Dimethyl 5-Sulfoisophthalate, sodium salt, Ethylene Glycol, and Propylene Glycol—To a 250 ml, three neck, round bottom flask equipped with a magnetic stirring bar, modified Claisen head, condenser (set for distillation), thermometer, and temperature controller (Therm-O-Watch™, I$^2$R) is added sodium 2-[2-(2-hydroxyethoxy)ethoxy]ethanesulfonate (10.3 g, 0.044 mol, prepared as in Example I), dimethyl terephthalate (Aldrich, 21.2 g, 0.109 mol), dimethyl 5-sulfoisophthalate, sodium salt (Aldrich, 6.5 g, 0.022 mol), ethylene glycol (Baker, 20.3 g, 0.327 mol), propylene glycol (Baker, 23.2 g, 0.305 mol), hydrated monobutyltin oxide (M&T Chemicals, 0.16 g, 0.2% of total reaction weight), and sodium acetate (MCB, 0.04 g, 2 mol % of dimethyl 5-sulfoisophthalate, sodium salt). This mixture is heated to 180° C. and maintained at that temperature overnight under argon as methanol and water distill from the reaction vessel. The material is transferred to a 1000 ml single neck, round bottom flask and heated gradually over about 20 minutes to 240° C. in a Kugelrohr apparatus (Aldrich) at about 0.5 mm Hg and maintained there for 2 hours. The reaction flask is then allowed to cool quite rapidly to near room temperature under vacuum (~30 min.). The reaction affords 29 g of the desired oligomer as an orange glass. A $^{13}$C-NMR(DMSO-d$_6$) shows a resonance for a —C(O)OCH$_2$C$\underline{H}_2$O(O)C— at ~63.2 ppm (diester). A resonance for —C(O)OC$\underline{H}_2$CH$_2$OH at ~59.4 ppm (monoester) is still detectable. The ratio of the heights of the diester peak to the monoester peak is measured to be 10. A resonance at ~51.0 ppm representing the sulfoethoxy capping group (—$\underline{C}$H$_2$SO$_3$Na) is also present. A $^1$H-NMR(DMSO-d$_6$) shows a resonance at ~8.4 ppm representing the sulfoisophthalate aromatic hydrogens and a resonance at ~7.9 ppm representing terephthalate aromatic hydrogens. The ratio of the peak for the methylene groups of diesters of ethylene glycol at ~4.7 ppm to the area of the peak for the methylene groups of diesters of propylene glycol at ~5.4 ppm is measured. From this, the molar ratio of incorporated ethylene/propylene glycols (E/P ratio) is calculated to be 1.8:1. The solubility is tested by weighing small amounts of material into 2 vials, crushing it, adding enough distilled water to make 5% and 10% by weight solutions, respectively, and agitating the vials vigorously. The material is soluble under these conditions.

EXAMPLE IV

Synthesis of an Oligomer of Sodium Alpha-3-Sulfopropyl-Omega-Hydroxy-Poly(oxy-1,2-ethanediyl), with Average Degree of Ethoxylation of 3, Dimethyl Terephthalate, Dimethyl 5-Sulfoisophthalate, Sodium Salt, Ethylene Glycol, Propylene Glycol and Diethylene Glycol—To a 250 ml, three neck, round bottom flask equipped with a magnetic stirring bar, modified Claisen head, condenser (set for distillation), thermometer, and temperature controller (Therm-O-Watch™, I$^2$R) is added sodium alpha-3-sulfopropyl-omega-hydroxy-poly(oxy-1,2-ethanediyl), with average degree of ethoxylation of 3, (15.3 g, 0.052 mol, prepared as in Example II), dimethyl terephthalate (Aldrich, 55.5 g, 0.286 mol), dimethyl 5-sulfoisophthalate, sodium salt (Aldrich, 15.4 g, 0.052 mol), ethylene glycol (Baker, 24.8 g, 0.400 mol), propylene glycol (Baker, 27.7 g, 0.364 mol), diethylene glycol (Fisher, 6.6 g, 0.0624 mol), hydrated monobutyltin oxide (M&T Chemicals, 0.19 g, 0.2% of total reaction weight), and sodium acetate (MCB, 0.09 g, 2 mol % of dimethyl 5-sulfoisophthalate, sodium salt). This mixture is heated to 180° C. and maintained at that temperature overnight under argon as methanol distills from the reaction vessel. The material is then transferred to a 1000 ml, single neck, round bottom flask and heated gradually over about 20 minutes to 240° C. in a Kugelrohr apparatus (Aldrich) at about 0.5 mm Hg and maintained there for 3 hours. The reaction flask is then allowed to air cool quite rapidly to near room temperature under vacuum (~30 min.). The reaction affords about 73 g of the desired oligomer as a brown glass. A $^{13}$C-NMR (DMSO-d$_6$) shows a resonance for —C(O)OCH$_2$C$\underline{H}_2$O(O)C— at ~63.2 ppm (diester). A resonance for —C(O)OC$\underline{H}_2$CH$_2$OH at ~59.4 ppm (monoester) is not detectable and is at least 20 times smaller than the diester peak. A resonance at ~48.0 ppm representing the sulfopropoxypolyethoxy capping group (—$\underline{C}$H$_2$SO$_3$Na) is also present. A $^1$H-NMR(DMSO-d$_6$) shows a resonance at ~8.4 ppm representing the sulfoisophthalate aromatic hydrogens and a resonance at ~7.9 ppm representing terephthalate aromatic hydrogens. The ratio of the peak for the methylene groups of diesters of ethylene glycol at ~4.7 ppm to the area of the peak of the methyne proton of diesters of propylene glycol at ~5.4 ppm measured. From this, the molar ratio of incorporated ethylene/propylene glycols (EG/PG ratio) is calculated to be 2:1. Hydrolysis of a sample of the polymer and gas chromatographic analysis shows diethylene glycol is incorporated at 5 wt % in the polymer. This corresponds to about 12 mole % of the sum of all the incorporated glycols. The solubility is tested by weighing small amounts of material into 2 vials, adding enough distilled water to make 5% and 10% by weight solutions, respectively, and agitating the vials vigorously. The material is mostly soluble under these conditions.

EXAMPLE V

Synthesis of an Oligomer of Dimethyl Terephthalate, Dimethyl 5-Sulfoisophthalate, Ethylene Glycol, and Sodium Alpha-3-Sulfopropyl-Omega-Hydroxy-Poly(oxy-1,2-ethanediyl), with Average Degree of Ethoxylation of 3—To a 250 ml, three-neck round bottom flask equipped with a magnetic stirrer, modified Claisen head, condenser set for distillation, and thermometer with Therm-O-Watch™ (I²R) temperature controller are added sodium alpha-3-sulfopropyl-omega-hydroxy-poly(oxy-1,2-ethanediyl), with average degree of ethoxylation of 3 (9 g, 0.0306 mol, prepared as in Example II), dimethyl terephthalate (22.9 g, 0.118 mol, Aldrich), dimethyl 5-sulfoisophthalate, monosodium salt (Aldrich, 7 g, 0.0236 mol), ethylene glycol (41.7 g 0.673 mol, MCB), sodium acetate (MCB, 0.04 g) and hydrated butyltin oxide (M&T Chemicals, 0.16 g). The mixture is heated overnight under an inert atmosphere at 180° C. as methanol distills out of the reaction mixture. The mixture is then transferred to a 500 ml, single neck, round bottom flask and heated on a Kugelrohr apparatus (Aldrich) at 240° C. for about 1.5 hours at about 0.3 mm Hg. The reaction mixture is allowed to cool quite rapidly to room temperature to give the desired oligomer as a light brown glassy solid. The $^{13}$C-NMR(d$_6$-DMSO) spectrum shows a peak at about 63.4 ppm for the diesters of ethylene glycol [—C(O)OCH$_2$CH$_2$OC(O)—] and a smaller peak at about 59.6 ppm for residual monoesters of ethylene glycol [—C(O)OCH$_2$CH$_2$OH]. The ratio of the heights of the peaks is 13:1 for Completion Index of 13. The solubility is tested by weighing small amounts of material into a vial, adding enough distilled water to make a 5% by weight solution, and agitating the vial vigorously. The material dissolves to give a clear solution under these conditions.

EXAMPLE VI

Oligomer of Sodium 2-(Hydroxyethoxy)Ethanesulfonate, Dimethyl Terephthalate, Dimethyl 5-Sodiosulfoisophthalate, Ethylene Glycol, and Poly (Ethylene Glycol)—In a one-neck, round bottom flask, equipped with magnetic stirring, internal thermometer, Therm-O-Watch™ (I²R) temperature controller, inert gas inlet, and modified Claisen head is placed dimethyl terephthalate (30.6 g, 0.156 mole, Aldrich) ethylene glycol (44 g, 0.7 mole Baker), dimethyl 5-sodiosulfoisophthalate (7.4 g, 0.025 mole, Aldrich), poly(ethylene glycol) MW=200 (5.0 g, 0.025 mole, Aldrich), and Fascat-4100™ (0.5 g, M&T Chem. Co.). To this is added sodium 2-(hydroxyethoxy) ethanesulfonate (10.0 g, 0.05 mole) prepared as in Example I. This mixture is heated under a positive inert gas atmosphere at 180° C. for 20 hours as methanol distills from the system. $^{13}$C-NMR (DMSO) analysis of the resulting material shows complete conversion of the methyl esters by the absence of a peak at about 54 ppm.

This material is heated at 240° C. at 1 mmHg in a Kugelrohr apparatus (Aldrich) for one hour. The reaction is allowed to cool quite rapidly to room temperature to give a glassy solid. $^{13}$C-NMR (DMSO) analysis of the material shows high conversion to the desired oligomer by the absence of any peaks in the 59 to 61 ppm region corresponding to monoesters of ethylene glycol or unesterified sodium 2-(2-hydroxyethoxy)-ethanesulfonate. A small, crushed sample of glassy oligomer dissolves well at the 5% solids level when agitated vigorously with distilled water at room temperature.

EXAMPLE VII

Synthesis of an Oligomer of Sodium Isethionate, Sodium 2-(2-Hydroxyethoxy)ethanesulfonate, Dimethyl Terephthalate, Dimethyl 5-Sulfoisophthalate, Sodium Salt, and Ethylene Glycol—To a 250 ml, three neck, round bottom flask equipped with a magnetic stirring bar, modified Claisen head, condenser (set for distillation), thermometer, and temperature controller (Therm-O-Watch™, I²R) is added isethionic acid, sodium salt (Aldrich, 4.7 g, 0.032 mol), sodium 2-(2-hydroxyethoxy)ethanesulfonate (6.1 g, 0.032 mol, prepared as in Example I), dimethyl terephthalate (27.6 g, 0.142 mol), dimethyl 5-sulfoisophthalate, sodium salt (Aldrich, 9.4 g, 0.032 mol), ethylene glycol (Baker, 55.9 g, 0.900 mol), hydrated monobutyltin oxide (M&T Chemicals, 0.21 g, 0.2% of total reaction weight), sodium acetate (MCB, 0.05 g, 2 mol % of dimethyl 5-sulfoisophthalate, sodium salt), and sodium dodecylbenzenesulfonate (Siponate LDS-10™ Alcolac, vacuum dried, 3.0 g, 6% of polymer wt.) This mixture is heated to 180° C. and maintained at that temperature overnight under argon as methanol and water distill from the reaction vessel. The material is transferred to a 1000 ml, single neck, round bottom flask and heated gradually over about 20 minutes to 240° C. in a Kugelrohr apparatus (Aldrich) at about 0.5 mm Hg and maintained there for 1 hour. Foaming which occurs during the Kugelrohr process results in the loss of some material. The reaction flask is then allowed to air cool quite rapidly to near room temperature under vacuum (~30 min.) The reaction affords 10.4 g of the desired oligomer as a tan, opaque solid. A $^{13}$C-NMR(DMSO-d$_6$) shows a resonance for —C(O)OCH$_2$CH$_2$O(O)C— at ~63.2 ppm (diester). A resonance for —C(O)OCH$_2$CH$_2$OH at ~59.4 ppm (monoester) is also detectable. The ratio of the heights of the diester peak to monoester peak is measured to be 12.8. Resonances at ~49.8 ppm and ~51.0 ppm representing the two sulfoethoxy capping groups (—CH$_2$SO$_3$Na) are also present. A $^1$H-NMR(DMSO-d$_6$) shows a resonance at ~8.4 ppm representing the sulfoisophthalate aromatic hydrogens and a resonance at ~7.9 ppm representing terephthalate aromatic hydrogens. The solubility is tested by weighing small amounts of material into 2 vials, crushing it, adding enough distilled water to make 5% and 10% by weight solutions, and agitating the vials vigorously. The majority of the sample is soluble under these conditions.

Test Method—The following test method can be used to determine "completion index" of the s.r.a.'s of the invention.

1. The s.r.a. is well mixed as a melt to ensure representative sampling and is cooled rapidly from a temperature above the melting-point to well below the vitrification temperature, e.g., 45° C. or lower.
2. A solid sample of the bulk s.r.a. is taken.
3. A 10% solution of the s.r.a. in (methyl sulfoxide)-d$_6$ containing 1% v/v tetramethylsilane (Aldrich Chemical Co.) is made up. If necessary, warming to 90°–100° C. is used to achieve substantially complete dissolution of the s.r.a.
4. The solution is placed in a 180×5 mm NMR tube (Wilmad Scientific Glass, 507-pp-7 Royal Imperial thin-walled 5 mm NMR sample tubes, 8".)

5. The $^{13}C$ NMR spectrum is obtained under the following conditions:
   a. General Electric QE-300 NMR instrument
   b. probe temperature=25° C.
   c. one pulse sequence
   d. pulse width=6.00 microseconds=30 degree
   e. acquisition time=819.20 msec
   f. recycle time=1.00 sec
   g. no. of acquisitions=5000
   h. data size=32768
   i. line broadening=3.00 Hz
   j. spin rate=13 rps
   k. observe:
      frequency=75.480824 MHz
      spec width=20,000 Hz
      gain=60*8
   l. decoupler:
      standard broad band, 64 modulation
      frequency=4.000 ppm
      power=2785/3000
   m. plot scale:
      510.64 Hz/cm
      6.7652 ppm/cm
      from 225.00 to ~4.99 ppm
6. The height of the tallest resonance observed in the 63.0–63.8 ppm region (referred to as "the 63 peak" and associated with diesters of ethylene glycol) is measured. (This is often observed as a single peak under the specified conditions but may appear as a poorly resolved multiplet).
7. The height of the resonance observed at about 5.89 ppm (referred to as "the 60 peak") and associated with monoesters of ethylene glycol is measured. (When this is large enough to distinguish from the baseline, it normally appears to be a single peak under the specified conditions.)
8. The completion index is calculated as the height ratio for the "63 peak" over the "60 peak".

Use of Esters of the Invention as Soil-Release Agents—Esters of the invention are especially useful as soil release agents of a type compatible in the laundry with conventional detersive ingredients such as those found in granular laundry detergents. Additionally, the esters are useful in laundry additive or pretreatment compositions comprising the essential soil release agents and optional detergent ingredients. The soil release agents, as provided herein, will typically constitute at least about 0.1%, preferably from about 0.1% to about 10%, most preferably from about 0.2% to about 3.0% by weight of a detergent composition.

Detersive Surfactant—The amount of detersive surfactant included in the fully-formulated detergent compositions afforded by the present invention can vary from about 1% to about 99.8% by weight of detergent composition depending upon the particular surfactants used and the effects desired. Preferably, the detersive surfactants comprise from about 5% to about 80% by weight of the composition.

The detersive surfactant can be nonionic, anionic, ampholytic, zwitterionic, or cationic. Mixtures of these surfactants can also be used. Preferred detergent compositions comprise anionic detersive surfactants or mixtures of anionic surfactants with other surfactants, especially nonionic surfactants.

Nonlimiting examples of surfactants useful herein include the conventional $C_{11}$–$C_{18}$ alkyl benzene sulfonates and primary, secondary, and random alkyl sulfates, the $C_{10}$–$C_{18}$ alkyl alkoxy sulfates, the $C_{10}$–$C_{18}$ alkyl polyglycosides and their corresponding sulfated polyglycosides, $C_{12}$–$C_{18}$ alpha-sulfonated fatty acid esters, $C_{12}$–$C_{18}$ alkyl and alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like. Other conventional useful surfactants are listed in standard texts.

One class of nonionic surfactant particularly useful in detergent compositions of the present invention is condensates of ethylene oxide with a hydrophobic moiety to provide a surfactant having an average hydrophilic-lipophilic balance (HLB) in the range of from 5 to 17, preferably from 6 to 14, more preferably from 7 to 12. The hydrophobic (lipophilic) moiety may be aliphatic or aromatic in nature. The length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_9$–$C_{15}$ primary alcohol ethoxylates containing 3–8 moles of ethylene oxide per mole of alcohol, particularly the $C_{14}$–$C_{15}$ primary alcohols containing 6–8 moles of ethylene oxide per mole of alcohol, the $C_{12}$–$C_{15}$ primary alcohols containing 3–5 moles of ethylene oxide per mole of alcohol, and mixtures thereof.

Another suitable class of nonionic surfactants comprises the polyhydroxy fatty acid amides of the formula:

wherein: $R^1$ is H, $C_1$–$C_8$ hydrocarbyl, 2-hydroxyethyl, 2-hydroxypropyl, or a mixture thereof, preferably $C_1$–$C_4$ alkyl, more preferably $C_1$ or $C_2$ alkyl, most preferably $C_1$ alkyl (i.e., methyl); and $R^2$ is a $C_5$–$C_{32}$ hydrocarbyl moiety, preferably straight chain $C_7$–$C_{19}$ alkyl or alkenyl, more preferably straight chain $C_9$–$C_{17}$ alkyl or alkenyl, most preferably straight chain $C_{11}$–$C_{19}$ alkyl or alkenyl, or mixture thereof; and Z is a polyhydroxyhydrocarbyl moiety having a linear hydrocarbyl chain with at least 2 (in the case of glyceraldehyde) or at least 3 hydroxyls (in the case of other reducing sugars) directly connected to the chain, or an alkoxylated derivative (preferably ethoxylated or propoxylated) thereof. Z preferably will be derived from a reducing sugar in a reductive amination reaction; more preferably Z is a glycityl moiety. Suitable reducing sugars include glucose, fructose, maltose, lactose, galactose, mannose, and xylose, as well as glyceraldehyde. As raw materials, high dextrose corn syrup, high fructose corn syrup, and high maltose corn syrup can be utilized as well as the individual sugars listed above. These corn syrups may yield a mix of sugar components for Z. It should be understood that it is by no means intended to exclude other suitable raw materials. Z preferably will be selected from the group consisting of —$CH_2$—$(CHOH)_n$—$CH_2OH$, —CH($CH_2OH$)—$(CHOH)_{n-1}$—$CH_2OH$, —$CH_2$—$(CHOH)_2$($CHOR'$)($CHOH$)—$CH_2OH$, where n is an integer from 1 to 5, inclusive, and R' is H or a cyclic mono- or polysaccharide, and alkoxylated derivatives thereof. Most preferred are glycityls wherein n is 4, particularly —$CH_2$—$(CHOH)_4$—$CH_2OH$.

In Formula (I), $R^1$ can be, for example, N-methyl, N-ethyl, N-propyl, N-isopropyl, N-butyl, N-isobutyl, N-2-hydroxy ethyl, or N-2-hydroxy propyl. For highest sudsing, $R^1$ is preferably methyl or hydroxyalkyl. If lower sudsing is desired, $R^1$ is preferably $C_2$–$C_8$ alkyl, especially n-propyl, iso-propyl, n-butyl, iso-butyl, pentyl, hexyl and 2-ethyl hexyl.

$R^2$—CO—N< can be, for example, cocamide, stearamide, oleamide, lauramide, myristamide, capricamide, palmitamide, tallowamide, etc.

Detersive Builders—Optional detergent ingredients employed in the present invention contain inorganic and/or organic detersive builders to assist in mineral hardness control. If used, these builders comprise from about 5% to about 80% by weight of the detergent compositions.

Inorganic detersive builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales.

Examples of silicate builders are the alkali metal silicates, particularly those having a $SiO_2:Na_2O$ ratio in the range 1.6:1 to 3.2:1 and layered silicates, such as the layered sodium silicates described in U.S. Pat. No. 4,664,839, issued May 12, 1987 to H. P. Rieck, available from Hoechst under the trademark "SKS"; SKS-6 is an especially preferred layered silicate builder.

Aluminosilicate builders are especially useful in the present invention. Preferred aluminosilicates are zeolite builders which have the formula:

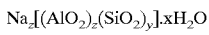

$$Na_z[(AlO_2)_z(SiO_2)_y]\cdot xH_2O$$

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. Methods for producing aluminosilicate ion exchange materials are disclosed in U.S. Pat. No. 3,985,669, Krummel, et al, issued Oct. 12, 1976, and U.S. Pat. No. 4,605,509, Corkill, et al, issued Aug. 12, 1986. Preferred synthetic crystalline aluminosilicate ion exchange materials useful herein are available under the designations Zeolite A, Zeolite P (B), (including those disclosed in EPO 384,070), and Zeolite X. Preferably, the aluminosilicate has a particle size of about 0.1–10 microns in diameter.

Organic detersive builders suitable for the purposes of the present invention include, but are not restricted to, a wide variety of polycarboxylate compounds, such as ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987.

Other useful detersive builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are preferred polycarboxylate builders that can also be used in granular compositions, especially in combination with zeolite and/or layered silicate builders.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used.

Optional Detersive Adjuncts—As a preferred embodiment, the conventional detergent ingredients employed herein can be selected from typical detergent composition components such as detersive surfactants and detersive builders. Optionally, the detergent ingredients can include one or more other detersive adjuncts or other materials for assisting or enhancing cleaning performance, treatment of the substrate to be cleaned, or to modify the aesthetics of the detergent composition. Usual detersive adjuncts of detergent compositions include the ingredients set forth in U.S. Pat. No. 3,936,537, Baskerville et al. Adjuncts which can also be included in detergent compositions employed in the present invention, in their conventional art-established levels for use (generally from 0% to about 20% of the detergent ingredients, preferably from about 0.5% to about 10%), include enzymes, especially proteases, lipases, and cellulases, color speckles, suds boosters, suds suppressors, antitarnish and/or anticorrosion agents, soil-suspending agents, dyes, fillers, optical brighteners, germicides, alkalinity sources, hydrotropes, antioxidants, enzyme stabilizing agents, perfumes, solvents, solubilizing agents, clay soil removal/anti-redeposition agents, polymeric dispersing agents, dye transfer inhibiting agents, including polyamine N-oxides such as polyvinylpyrrolidone and copolymers of N-vinyl imidazole and N-vinyl pyrrolidone, processing aids, fabric softening components, static control agents, etc.

Bleaching Agents—Optionally, the detergent compositions employed herein can comprise one or more conventional bleaching agents, activators, or stabilizers, especially peroxyacids, which do not react with the soil release compositions of this invention. In general, the formulator will ensure that the bleach compounds used are compatible with the detergent formulation. Conventional tests, such as tests of bleach activity on storage in the presence of the separate or fully-formulated ingredients, can be used for this purpose.

The peroxyacid can be a preformed peroxyacid, or a combination of an inorganic persalt (e.g., sodium perborate or sodium percarbonate), and an organic peroxyacid precursor which is converted to a peroxyacid when the combination of persalt and precursor is dissolved in water. The organic peroxyacid precursors are often referred to in the art as bleach activators.

Examples of suitable organic peroxyacids are disclosed in U.S. Pat. No. 4,374,035, Bossu, issued Feb. 15, 1983; U.S. Pat. No. 4,681,592, Hardy et al, issued Jul. 21, 1987; U.S. Pat. No. 4,634,551, Burns et al, issued Jan. 6, 1987; U.S. Pat. No. 4,686,063, Burns, issued Aug. 11, 1987; U.S. Pat. No. 4,606,838, Burns, issued Aug. 19, 1986; and U.S. Pat. No. 4,671,891, Hartman, issued Jun. 9, 1987. Examples of compositions suitable for laundry bleaching which contain perborate bleaches and activators therefor are disclosed in U.S. Pat. No. 4,412,934, Chung and Spadini, issued November 1983; U.S. Pat. No. 4,536,314, Hardy et al, issued Aug. 20, 1985; U.S. Pat. No. 4,681,695, Divo, issued Jul. 21, 1987; and U.S. Pat. No. 4,539,130, Thompson et al, issued Sep. 3, 1985.

Specific examples of preferred peroxyacids which can be incorporated in this invention include diperoxydodecanedioic acid (DPDA), nonylamide of peroxysuccinic acid (NAPSA), nonylamide of peroxyadipic acid (NAPAA) and decyldiperoxysuccinic acid (DDPSA). The peroxyacid is preferably incorporated into a soluble granule according to the method described in the above cited U.S. Pat. No. 4,374,035. A preferred bleach granule comprises, by weight, 1% to 50% of an exotherm control agent (e.g., boric acid); 1% to 25% of a peroxyacid compatible surfactant (e.g., C13LAS); 0.1% to 10% of one or more chelant stabilizers (e.g., sodium pyrophosphates); and 10% to 70% of a water-soluble processing salt (e.g., Na2SO4).

The peroxyacid bleach is used at a level which provides an amount of available oxygen (AvO) from about 0.1% to about 10%, preferably from about 0.5% to about 5%, and most preferably from about 1% to about 4%, all by weight of the composition.

Effective amounts of peroxyacid bleach per unit dose of the composition of this invention used in typical laundry liquor, e.g., containing 65 liters of 16°–60° C. water, provide from about 1 ppm to about 150 ppm of available oxygen (AvO), more preferably from about 2 ppm to about 20 ppm. The laundry liquor should also have a pH of from 7 to 11, preferably 7.5 to 10.5, for effective peroxyacid bleaching. See Col. 6, lines 1–10, of U.S. Pat. No. 4,374,035.

Alternatively, the composition may contain a suitable organic precursor which generates one of the above peroxyacids when reacted with alkaline hydrogen peroxide in aqueous solution. The source of hydrogen peroxide can be any inorganic peroxygen compound which dissolves in aqueous solution to generate hydrogen peroxide, e.g., sodium perborate (monohydrate and tetrahydrate) and sodium percarbonate.

The level of peroxygen bleach within compositions of the invention is from about 0.1% to about 95% and preferably from about 1% to about 60%. When the bleaching compositions within the invention are also fully formulated detergent compositions, it is preferred that the level of peroxygen bleach is from about 1% to about 20%.

The level of bleach activator within the compositions of the invention is from about 0.1% to about 60% and preferably from about 0.5% to about 40%. When the bleaching compositions within the invention are also fully formulated detergent compositions, it is preferred that the level of bleach activator is from about 0.5% to about 20%.

The peroxyacid and the soil release esters herein are preferably present at a weight ratio of available oxygen provided by the peroxyacid to soil release esters of from about 4:1 to about 1:30, more preferably from about 2:1 to about 1:15, and most preferably from about 1:1 to about 1:7.5. The combination can be incorporated into a fully formulated, stand alone product, or it can be formulated as an additive to be used in combination with a laundry detergent.

Cellulase Enzyme—Optionally, the detergent compositions employed herein can comprise one or more conventional enzymes that do not react with the soil release compositions of this invention. A particularly preferred enzyme is cellulase. The cellulase employed herein may be any bacterical or fungal cellulase, having a pH optimum of between 5 and 9.5. Suitable cellulases are disclosed in U.S. Pat. No. 4,435,307, Barbesgoard et al, issued Mar. 6, 1984, which discloses fungal cellulase produced by a strain of Humicola insolens, particularly by the Humicola strain DSM 1800 or a cellulase 212-producing fungus belonging to the genus Aeromonas, and cellulase extracted from the hepatopancreas of a marine mullosk (Dolabella Auricula Solander). Suitable cellulases are also disclosed in GB-A-2,075,028, GB-A-2,095,275 and DE-OS-2,247,832.

Preferred cellulases are those as described in International Patent Application WO 91/17243. For example, a cellulase preparation useful in the compositions of the invention can consist essentially of a homogeneous endoglucanase component, which is immunoreactive with an antibody raised against a highly purified 43 kD cellulase derived from Humicola insolens, DSM 1800, or which is homologous to said 43 kD endoglucanase.

Enzymes are normally incorporated at a level sufficient to provide up to about 50 mg by weight, more typically about 0.01 mg to about 10 mg, of active enzyme per gram of detergent composition. Stated otherwise, an effective amount of the enzymes optionally employed in the present invention will comprise at least about 0.001%, preferably from about 0.001% to about 5%, more preferably from about 0.001% to about 1%, most preferably from about 0.01% to about 1%, by weight of detergent composition.

The soil release agents of the invention, at concentrations in an aqueous fabric laundering liquor ranging from about 1 to about 50 ppm, more preferably about 2.5 to about 30 ppm, provide effective, combined cleaning and soil release treatments for polyester, polyester-cotton blends, and other synthetic fabrics washed in an aqueous, preferably alkaline (pH range about 7 to about 11, more preferably about 7.5 to about 10.5) environment, in the presence of typical granular detergent ingredients. Surprisingly (especially insofar as pH and anionic surfactant are concerned), the above-identified detergent ingredients can be present in the wash water at their art disclosed levels to perform their conventional tasks, e.g., for cleaning and bleaching fabrics or the like, without ill-effects on the soil release properties of the esters.

Thus the invention encompasses a method of laundering fabrics and concurrently providing a soil release finish thereto. The method simply comprises contacting said fabrics with an aqueous laundry liquor containing the conventional detersive ingredients described hereinabove, as well as the above-disclosed effective levels of a soil release agent (namely, from about 1 to 50 ppm of an oligomeric composition comprising at least 10% by weight of an ester of the invention). Although this method is not especially limited in terms of factors such as pH and surfactant types present, it should be appreciated that for best cleaning of fabrics, it is often especially desirable to make use in the laundry process of anionic surfactants, such as conventional linear alkylbenzene sulfonates and also to use higher pH ranges as defined above. Use of these surfactants and pH ranges surprisingly does not prevent the esters of the invention from acting effectively as soil release agents. Thus, a preferred method for an optimized combination of cleaning and soil-release finishing provided by the invention constitutes using all of the following:

the preferred levels of soil release agent (2.5–30 ppm);
anionic surfactant;
pH of from about 7 to about 11; and, by way of soil release agent, a preferred composition of the invention, such as the oligomeric product of reacting compounds comprising ethoxylated or propoxylated hydrox-ethane and propane sulfonate end-caps, dimethyl terephthalate, dimethyl sulfoisophthalate, ethylene glycol, propylene glycol, and diethylene glycol.

In the preferred method polyester, polyester-cotton blends, and other synthetic fabrics are used; best soil release results are achieved thereon, but other fabric types can also be present.

The most highly preferred method for simultaneous cleaning and soil-release treatment is a "multi-cycle" method; although benefits are surprisingly obtainable after as little treatment as a single laundry/use cycle, best results are obtained using two or more cycles comprising the ordered sequence of steps:

a) contacting said fabrics with said aqueous laundry liquor in a conventional automatic washing machine or by hand-wash for periods ranging from about 5 minutes to about 1 hour;

b) rinsing said fabrics with water;

c) line- or tumble-drying said fabrics; and d) exposing said fabrics to soiling through normal wear or domestic use.

Naturally, it will be appreciated that this "multi-cycle" method encompasses methods starting at any one of steps a) through d), provided that the soil release treatment step (a) is used two or more times. Optionally, a further "soaking" step may be included in the laundry/use cycle. Typically, users soak or pre-soak laundry for as little as five minutes to as long as overnight or longer by contacting said fabrics with said aqueous laundry liquor.

In the above, step (a) includes both hand-washing or U.S., Japanese, or European washing machines operating under their conventional conditions of time, temperature, fabric load, amounts of water and laundry product concentrations. Also, in step (c), the "tumble-drying" to which is referred especially involves use of conventional domestic brands of programmable laundry dryers (these are occasionally integral with the washing machine) using their conventional fabric loads, temperatures and operating times.

The following nonlimiting examples illustrate the use of a typical ester composition of the invention (that of Example III) as a soil release agent for thru-the-wash application to polyester fabrics.

EXAMPLES VIII–XI

Granular detergent compositions are prepared comprising the following ingredients.

| Ingredient | Percent (Wt) | | | |
|---|---|---|---|---|
| | VIII | IX | X | XI |
| Na $C_{11}$–$C_{13}$ alkylbenzenesulfonate | 13.3 | 13.7 | 10.4 | 11.1 |
| Na $C_{14}$–$C_{15}$ alcohol sulfate | 3.9 | 4.0 | 4.5 | 11.2 |
| Na $C_{14}$–$C_{15}$ alcohol ethoxylate (0.5) sulfate | 2.0 | 2.0 | 0.0 | 0.0 |
| Na $C_{12}$–$C_{13}$ alcohol ethoxylate (6.5) | 0.5 | 0.5 | 0.05 | 1.0 |
| tallow fatty acid | 0.0 | 0.0 | 0.0 | 1.1 |
| Sodium tripolyphosphate | 0.0 | 41.0 | 0.0 | 0.0 |
| Zeolite A, hydrate (0.1–10 micron size) | 26.3 | 0.0 | 21.3 | 25.0 |
| Sodium carbonate | 23.9 | 12.4 | 25.2 | 16.1 |
| Sodium polyacrylate (45%) | 3.4 | 0.0 | 2.7 | 3.4 |
| Sodium silicate (1:6 ratio NaO/$SiO_2$)(46%) | 2.4 | 6.4 | 2.1 | 2.6 |
| Sodium sulfate | 10.5 | 10.9 | 8.2 | 5.0 |
| Sodium perborate | 1.0 | 1.0 | 5.0 | 10.0 |
| Poly(ethylene glycol), MW- 4000 (50%) | 1.7 | 0.4 | 1.0 | 1.1 |
| Citric acid | 0.0 | 0.0 | 3.0 | 0.0 |
| Nonyl ester of sodium p-hydroxybenzenesulfonate | 0.0 | 0.0 | 5.9 | 0.0 |
| Diperoxydodecanedioic acid | 0.0 | 0.0 | 0.0 | 6.0 |
| Moisture | 8.5 | 5.1 | 8.1 | 5.3 |

Balance to 100% can, for example, include minors like optical brightener, perfume, suds suppressor, soil dispersant, protease, lipase, cellulase, chelating agents, polyvinylpyrrolidone dye transfer inhibiting agents, additional water, and fillers including, $CaCO_3$, talc, silicates, clay, etc.

Aqueous crutcher mixes of heat and alkali stable components of the detergent compositions are prepared and spray-dried and the other ingredients are admixed so that they contain the ingredients tabulated at the levels shown. The soil release agent of Example III is pulverized and admixed in an amount sufficient for use at a level of 0.5% by weight in conjunction with the detergent compositions.

The detergent granules with soil release agents are added together with a 6 lb. load of previously laundered fabrics (load composition: 10 wt. % polyester fabrics/50 wt. % polyester-cotton/40 wt. % cotton fabrics) to a Sears KENMORE washing machine. Actual weights of detergent and ester compositions are taken to provide a 995 ppm concentration of the former and 5 ppm concentration of the latter in the 17 gallon (65 l) water-fill machine. The water used has 7 grains/gallon hardness and a pH of 7 to 7.5 prior to (about 9 to about 10.5 after) addition of the detergent and ester compositions.

The fabrics are laundered at 35° C. (95° F.) for a full cycle (12 min.) and rinsed at 21° C. (70° F.). The fabrics are then line dried and are exposed to a variety of soils (by wear or controlled application). The entire cycle of laundering and soiling is repeated several times for each of the detergent compositions. Separate fabric bundles are reserved for use with each of the detergent compositions. All polyester-containing fabrics display significantly improved removal of soils (especially oleophilic types) during laundering compared with fabrics which have not been exposed to the esters of the invention.

The soil release agents of the invention are especially useful in conventional laundry detergent compositions such as those typically found in granular detergents or laundry bars. U.S. Pat. No. 3,178,370, Okenfuss, issued Apr. 13, 1965, describes laundry detergent bars and processes for making them. Philippine Patent 13,778, Anderson, issued Sep. 23, 1980, describes synthetic detergent laundry bars. Methods for making laundry detergent bars by various extrusion methods are well known in the art.

EXAMPLE XII

A laundry bar suitable for hand-washing soiled fabrics is prepared by standard extrusion processes and comprises the following:

| Component | Weight % |
|---|---|
| $C_{12}$ linear alkyl benzene sulfonate | 30 |
| Phosphate (as sodium tripolyphosphate) | 7 |
| Sodium carbonate | 25 |
| Sodium pyrophosphate | 7 |
| Coconut monoethanolamide | 2 |
| Zeolite A (0.1–10 micron) | 5 |
| Carboxymethylcellulose | 0.2 |
| Ethylenediamine disuccinate chelant (EDDS) | 0.4 |
| Polyacrylate (m.w. 1400) | 0.2 |
| Nonanoyloxybenzenesulfonate | 5 |
| Sodium percarbonate* | 5 |
| Brightener, perfume | 0.2 |
| Protease | 0.3 |
| $CaSO_4$ | 1 |
| $MgSO_4$ | 1 |
| Water | 4 |
| Filler** | Balance to 100% |

*Average particle size of 400 to 1200 microns.
**Can be selected from convenient materials such as $CaCO_3$, talc, clay, silicates, and the like.

The detergent laundry bars are processed in conventional soap or detergent bar making equipment as commonly used in the art. The soil release agent of Example III is pulverized and admixed in an amount sufficient for use at a level of 0.5% by weight in conjunction with the detergent compositions. Testing is conducted following the testing methods in Examples VIII–XI. All polyester-containing fabrics display significantly improved removal of soils (especially oleophilic types) during laundering compared with fabrics which have not been exposed to the esters of the invention.

Optional Nonionic Surfactant Processing Agent—Optionally, to lower the melt viscosity and to further increase ease of dissolution in the wash liquor, nonionic surfactants can be added to the soil release agent reactants. During synthesis, soil release agents, especially doubly end-capped esters which contain end-cap units of sodium isethionate, sodium 2-[2-hydroxyethoxy]ethanesulfonate or sodium 3-(2-hydroxyethoxy)propanesulfonate and with little or no incorporated di- and/or poly(oxyethylene)oxy units, are highly viscous and, therefore, difficult to stir and pump. Further, such soil release agents tend to be slow to dissolve when introduced into the wash liquor. To avoid these difficulties, ethoxylated nonionic surfactants, such as tallow alcohol ethoxylates, with a degree of ethoxylation of from about 3 to about 50, preferably from about 5 to about 11, can be mixed with the soil release agent reactants. The nonionic agent can be added at any time near the end of the oligomerization step; however, transesterification of the nonionic agent with the soil release oligomer should be kept to a minimum. Preferably, the nonionic agent should be added just prior to the point at which maximum melt viscosity of the soil release agent would be achieved. The nonionic agent can also be thoroughly mixed with the soil release agent immediately after the oligomerization step while the oligomer is still in the molten state. The nonionic agent lowers the melt viscosity of the soil release agent and increases the ease of dissolution of the soil release agent when it is introduced to the wash liquor. Typically from about 0.05% to about 25%, preferably from about 0.1% to about 10%, by weight of soil release agent, of nonionic surfactant is added to the soil release agent.

EXAMPLE XIII

Synthesis of an Oligomer of Sodium Isethionate, Dimethyl Terephthalate, Dimethyl 5-Sulfoisophthalate, Sodium Salt, Ethylene Glycol, and Propylene Glycol—To a 250 ml, three neck, round bottom flask equipped with a magnetic stirring bar, modified Claisen head, condenser (set for distillation), thermometer, and temperature controller (Therm-O-Watch™, I²R) is added isethionic acid, sodium salt (Aldrich, 7.7 g, 0.052 mol), dimethyl terephthalate (55.5 g, 0.286 mol), dimethyl 5-sulfoisophthalate, sodium salt (Aldrich, 15.4 g, 0.052 mol), ethylene glycol (Baker, 24.2 g, 0.390 mol), propylene glycol (Baker, 28.7 g, 0.377 mol), diethylene glycol (Aldrich, 6.6 g, 0.0624 mol), hydrated monobutyltin oxide (M&T Chemicals, 0.17 g, 0.2% of total reaction weight), sodium acetate (MCB, 0.09 g, 2 mol % of dimethyl sulfoisophthalate, sodium salt), sodium cumenesulfonate (Ruetgers-Nease, 3.3 g, 4% of final polymer wt.), sodium xylenesulfonate (Ruetgers-Nease, 3.3 g, 4% of final polymer wt.), sodium p-toluenesulfonate (Ruetgers-Nease, 3.3 g, 4% of final polymer wt.). This mixture is heated to 180° C. and maintained at that temperature overnight under argon as methanol and water distill from the reaction vessel. The material is transferred to a 1000 ml, single neck, round bottom flask and heated gradually over about 20 minutes to 240° C. in a Kugelrohr apparatus (Aldrich) at about 2 mm Hg and maintained there for 3 hours. The reaction flask is then allowed to air cool quite rapidly to near room temperature under vacuum (~30 min.) The reaction affords 49 g of the desired oligomer as a yellow, crunchy glass. A $^{13}$C-NMR (DMSO-$d_6$) shows a resonance for —C(O)O$\underline{C}$H$_2$$\underline{C}$H$_2$O(O)C— at ~63.2 ppm (diester). A resonance for —C(O)O$\underline{C}$H$_2$CH$_2$OH at ~59.4 ppm (monoester) is not detectable and is at least 40 times smaller than the diester peak. A resonance at ~51.0 ppm representing the sulfoethoxy capping group (—$\underline{C}$H$_2$SO$_3$Na) is also present. A $^1$H-NMR(DMSO-$d_6$) shows a resonance at ~8.4 ppm representing the sulfoisophthalate aromatic hydrogens and a resonance at ~7.9 ppm representing terephthalate aromatic hydrogens. The ratio of the peak for the methylene groups of diesters of ethylene glycol at ~4.7 ppm to the area of the peak for the methyne proton of diesters of propylene glycol at ~5.4 ppm is measured. From this, the molar ratio of incorporated ethylene/propylene glycols (E/P ratio) is calculated to be 1.75:1. The solubility is tested by weighing small amounts of material into 2 vials, crushing it, adding enough distilled water to make 5% and 10% by weight solutions, respectively, and agitating the vials vigorously. The material is only partly soluble under these conditions.

The experiment is repeated with the addition of 10 grams of ethoxylated tallow alcohol (degree of ethoxylation=9) to the molten polymer after 2 hours and 50 minutes of vacuum condensation. The nonionic surfactant is vigorously mixed with the molten polymer, and the vacuum condensation conditions are continued for 5 more minutes. The polymer blend with the nonionic surfactant is then cooled to give a glassy solid. This solid dissolves better in water at room temperature than the sample made without the blended nonionic surfactant.

What is claimed is:

1. A laundry detergent composition comprising at least about 0.1% by weight of a water-soluble or water-dispersible oligomeric soil release agent comprising at least 10% of a substantially linear end-capped ester having molecular weight ranging from about 500 to about 8,000; said ester consisting essentially of, on a molar basis:

i) from about 1 to about 2 moles of end-capping units of the formula (MO$_3$S)(CH$_2$)$_m$(CH$_2$CH$_2$O)(RO)$_n$—, wherein M is a salt-forming cation, R is ethylene, propylene or a mixture thereof, m is 0 or 1, and n is from 0 to 4;

ii) from about 0.5 to about 66 moles of units selected from the group consisting of:
  a) oxyethyleneoxy units;
  b) oxy-1,2-propyleneoxy units; and
  c) mixtures of a) and b);

iii) from 0 to about 50 moles of di(oxyethylene)oxy units;

iv) from 0 to about 50 moles of poly(oxyethylene)oxy units with a degree of polymerization of at least 3;

v) from about 1.5 to about 40 moles of terephthaloyl units; and vi) from 0.05 to about 26 moles of 5-sulfoisophthaloyl units of the formula —(O)C(C$_6$H$_3$)(SO$_3$M)C(O)—, wherein M is a salt forming cation; provided that the total of units ii), iii), and iv) ranges from about 0.5 to about 66 moles and provided that the total of units iii) and iv) is no more than 75% of the total of units ii), iii), and iv) and provided that the weight percent of iii) and iv) is no more than 50% of the total weight of the oligomeric ester.

2. A laundry detergent composition according to claim 1 further comprising at least about 1% by weight of a detersive surfactant.

3. A laundry detergent composition according to claim 2 further comprising from about 5% to about 80% by weight of conventional detergent builders and from 0% to about 20% of detersive adjuncts.

4. A laundry detergent composition according to claim 1, wherein said soil release agent consists of said units i), ii), iii), iv), v), and vi); said agent further being characterized in that it has a linear backbone formed from ester-bond connected units ii), iii), iv), v), and vi).

5. A laundry detergent composition according to claim 4 which comprises from about 0.1% to about 10% by weight of said soil release agent having the empirical formula: $(CAP)_x(EG/PG)_{y'}(DEG)_{y''}(PEG)_{y'''}(T)_z(SIP)_q$; wherein (CAP) represents the sodium salt form of said ethoxylated or propoxylated hydroxy-ethane and propane sulfonate end-capping units i); (EG/PG) represents said oxyethyleneoxy, oxy-1,2-propyleneoxy, and mixtures thereof; (DEG) represents said di(oxyethylene)oxy units iii); (PEG) represents said poly(oxyethylene)oxy units iv); (T) represents said terephthaloyl units v); (SIP) represents the sodium salt form of said 5-sulfoisophthaloyl units vi); x is from about 1 to 2; y' is from about 0.5 to about 66; y'' is from 0 to about 50; y''' is from 0 to about 50; z is from about 1.5 to about 40; q is from about 0.05 to about 26; wherein x, y', y'', y''', z and q represent the average number of moles of the corresponding units per mole of said soil release agent.

6. The laundry detergent composition of claim 5, wherein x is about 2, y' is from about 2 to about 27, and z is from about 2 to about 20, and q is from about 0.4 to about 8.

7. The laundry detergent composition of claim 6, wherein x is about 2, y' is about 5, z is about 5, and q is about 1.

8. The laundry detergent composition of claim 7 wherein said soil release agent is comprised of at least about 50% by weight of said ester having molecular weight ranging from about 500 to about 5,000.

9. The laundry detergent composition of claim 8, wherein said backbone units ii) of said soil release agent consists essentially of oxyethyleneoxy units.

10. The laundry detergent composition of claim 3 further comprising a preformed peroxyacid bleach.

11. The laundry detergent composition of claim 3 further comprising from about 1% to about 20% of a peroxygen bleach and about 0.5% to about 20% of a bleach activator.

12. The laundry detergent composition of claim 11 wherein said detersive surfactant is a nonionic primary alcohol ethoxylate; said peroxygen bleach is sodium percarbonate; and wherein said detergent composition further comprises at least about 0.001% of cellulase enzyme; and from about 0.5% to about 10% of a dye transfer inhibiting agent.

13. A method of laundering fabrics and concurrently providing a soil release finish thereto, comprising contacting said fabrics with an aqueous laundry liquor containing from about 1 to about 50 ppm of a laundry detergent composition according to claim 1.

14. A method according to claim 13 wherein said laundry detergent composition further comprises at least about 1% of a detersive surfactant; wherein said soil release agent is present at a level of from about 2.5 to about 30 ppm in said aqueous laundry liquor and is further characterized in that it comprises the oligomeric product of reacting compounds selected from the group consisting of:

1) dimethyl terephthalate:

2) dimethyl 5-sulfoisophthalate;

3) one or more glycol reactants selected from the group consisting of:
   a) ethylene glycol;
   b) propylene glycol; and
   c) mixtures of a) and b); and 4) a compound selected from the group consisting of monovalent cation salts of said ethoxylated or propoxylated hydroxy-ethane and propane sulfonate end-cap units in the presence of at least one conventional transesterification catalyst.

15. A method according to claim 14 wherein said reacting compounds further comprise reactants selected from the group consisting of diethylene glycol, polyethylene glycol with a degree of polymerization of at least 3, and mixtures thereof.

16. A method according to claim 13, wherein said fabrics are subjected to two or more cycles each comprising the ordered sequence of steps:

a) contacting said fabrics with said aqueous laundry liquor in a conventional automatic washing-machine or by hand-wash for periods ranging from about 5 minutes to about 1 hour;

b) rinsing said fabrics with water;

c) line- or tumble-drying said fabrics; and d) exposing said fabrics to soiling through normal wear or domestic use.

17. A detergent composition according to claim 1 wherein said soil release agent further comprises from about 0.05% to about 25%, by weight, of an ethoxylated nonionic surfactant processing agent.

18. A detergent composition according to claim 17 further comprising at least about 1% of a nonionic primary alcohol ethoxylate detersive surfactant, from about 1% to about 20% of sodium percarbonate peroxygen bleach; from about 0.5% to about 20% of a bleach activator; at least about 0.001% of cellulase enzyme; and from about 0.5% to about 10% of a dye transfer inhibiting agent.

* * * * *